US012623772B2

(12) United States Patent
Ankney

(10) Patent No.: US 12,623,772 B2
(45) Date of Patent: May 12, 2026

(54) REGENERATIVE HIGH LIFT MAGNETIC CLUTCH AND BRAKE GENERATOR FOR ELECTRIC AIRCRAFT

(71) Applicant: Hamilton Sundstrand Corporation, Charlotte, NC (US)

(72) Inventor: Darrell E. Ankney, Dixon, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 184 days.

(21) Appl. No.: 18/414,708

(22) Filed: Jan. 17, 2024

(65) Prior Publication Data

US 2025/0229893 A1     Jul. 17, 2025

(51) Int. Cl.
 B64C 13/50 (2006.01)
 B64C 23/00 (2006.01)
 B64D 35/026 (2025.01)

(52) U.S. Cl.
 CPC ............ B64C 23/005 (2013.01); B64C 13/50 (2013.01); B64D 35/026 (2024.01)

(58) Field of Classification Search
 CPC ......... B64C 13/50; B64C 23/005; B64C 9/28; B64D 35/026
 See application file for complete search history.

(56) References Cited

U.S. PATENT DOCUMENTS

| | | | | |
|---|---|---|---|---|
| 6,227,487 | B1 * | 5/2001 | Clark | ........................ B64C 9/00 |
| | | | | 244/99.12 |
| 6,824,099 | B1 * | 11/2004 | Jones | ...................... B64C 13/28 |
| | | | | 244/99.2 |
| 7,506,842 | B2 * | 3/2009 | Jones | ................. B64D 45/0005 |
| | | | | 244/226 |
| 8,335,600 | B2 | 12/2012 | Breit et al. | |
| 8,789,791 | B2 | 7/2014 | Matasso et al. | |
| 10,179,643 | B2 * | 1/2019 | Nfonguem | .............. F16H 1/222 |
| 10,784,701 | B2 * | 9/2020 | Solodovnik | .............. H02J 5/00 |
| 11,628,943 | B2 * | 4/2023 | Bruce | ..................... H02J 1/102 |
| | | | | 307/9.1 |
| 2009/0157234 | A1 | 6/2009 | Breit et al. | |
| 2018/0086435 | A1 | 3/2018 | Gietzold et al. | |
| 2019/0181669 | A1 * | 6/2019 | Solodovnik | ........... H02J 7/1438 |
| 2022/0250496 | A1 | 8/2022 | Siegmeth | |
| 2023/0056909 | A1 * | 2/2023 | Gusman | ................. B64D 31/06 |

OTHER PUBLICATIONS

Search Report issued in European Patent Application No. 25152115.9; Date of Mailing Jun. 10, 2025 (10 pages).

* cited by examiner

*Primary Examiner* — Thai T Dinh
(74) *Attorney, Agent, or Firm* — CANTOR COLBURN LLP

(57) ABSTRACT

An electric aircraft includes system for operating the aircraft. The electric aircraft includes a wing having a first control surface, a second control surface, a battery and a gearbox mechanically coupled to the first control surface. The first control surface is operated, and a voltage is induced from mechanical energy generated during a deceleration of the first control surface that occurs while operating the first control surface, wherein an airflow across the first control surface causes the deceleration. The induced voltage can be stored at the battery or used to operate the second control surface using the induced voltage.

14 Claims, 8 Drawing Sheets

500

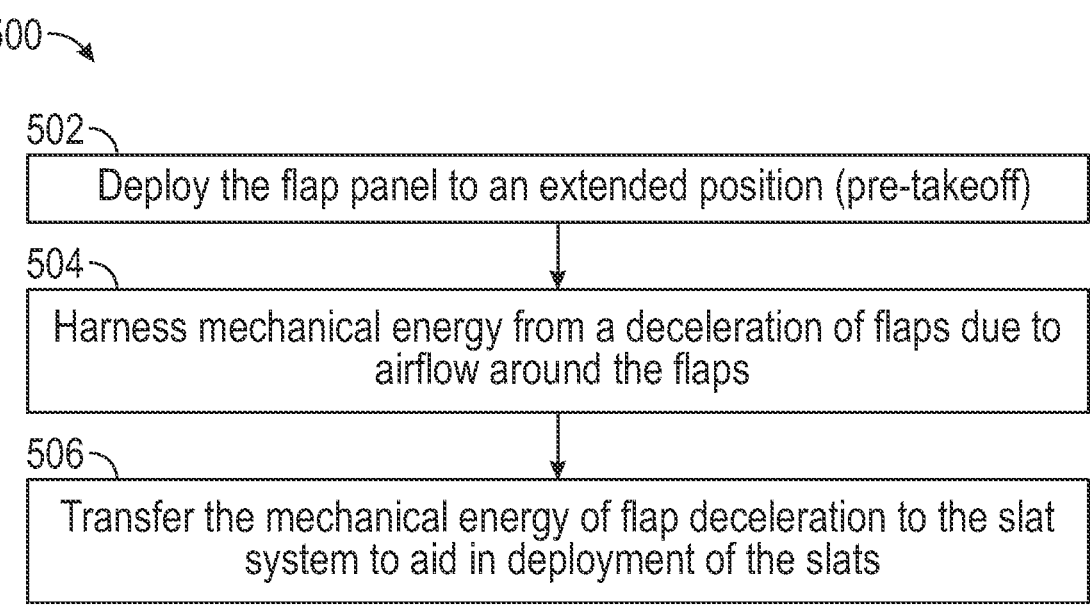

502

Deploy the flap panel to an extended position (pre-takeoff)

504

Harness mechanical energy from a deceleration of flaps due to airflow around the flaps

506

Transfer the mechanical energy of flap deceleration to the slat system to aid in deployment of the slats

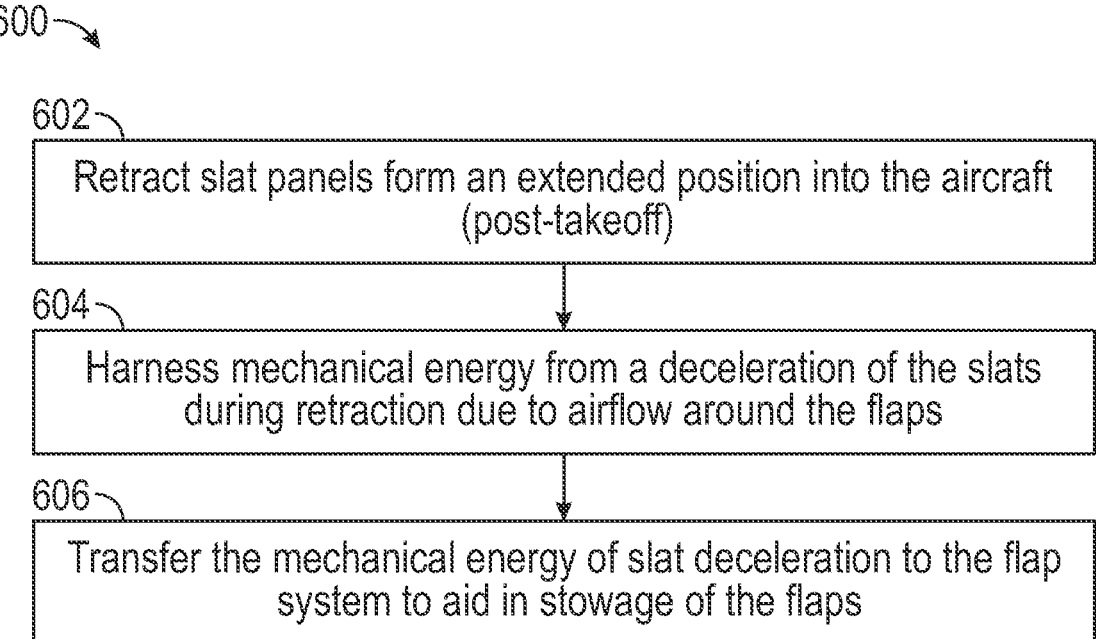

602

Retract slat panels form an extended position into the aircraft (post-takeoff)

604

Harness mechanical energy from a deceleration of the slats during retraction due to airflow around the flaps

606

Transfer the mechanical energy of slat deceleration to the flap system to aid in stowage of the flaps

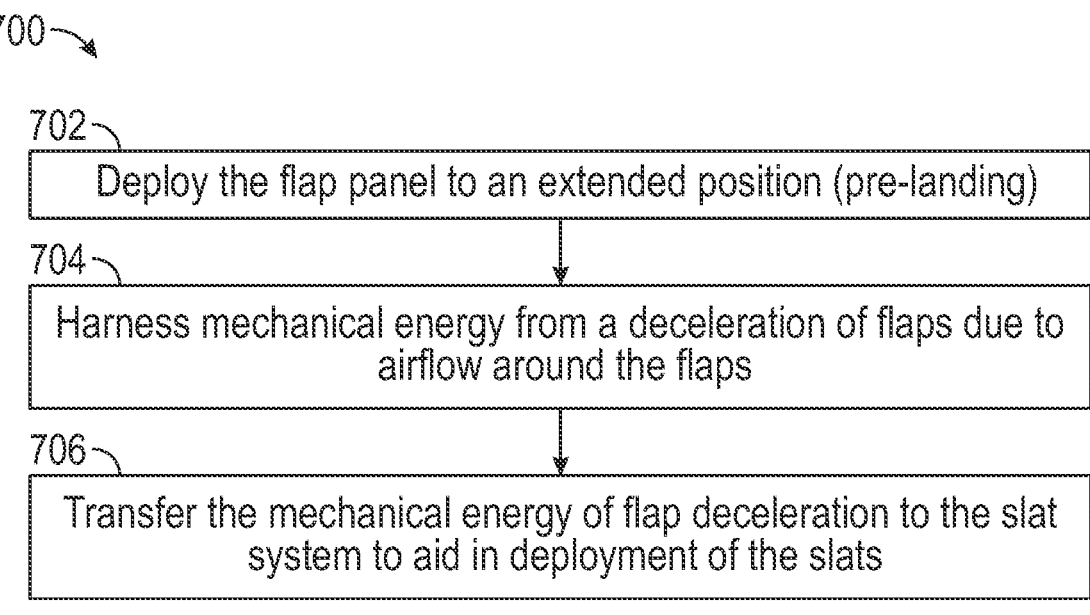

702 — Deploy the flap panel to an extended position (pre-landing)

704 — Harness mechanical energy from a deceleration of flaps due to airflow around the flaps 706 — Transfer the mechanical energy of flap deceleration to the slat system to aid in deployment of the slats

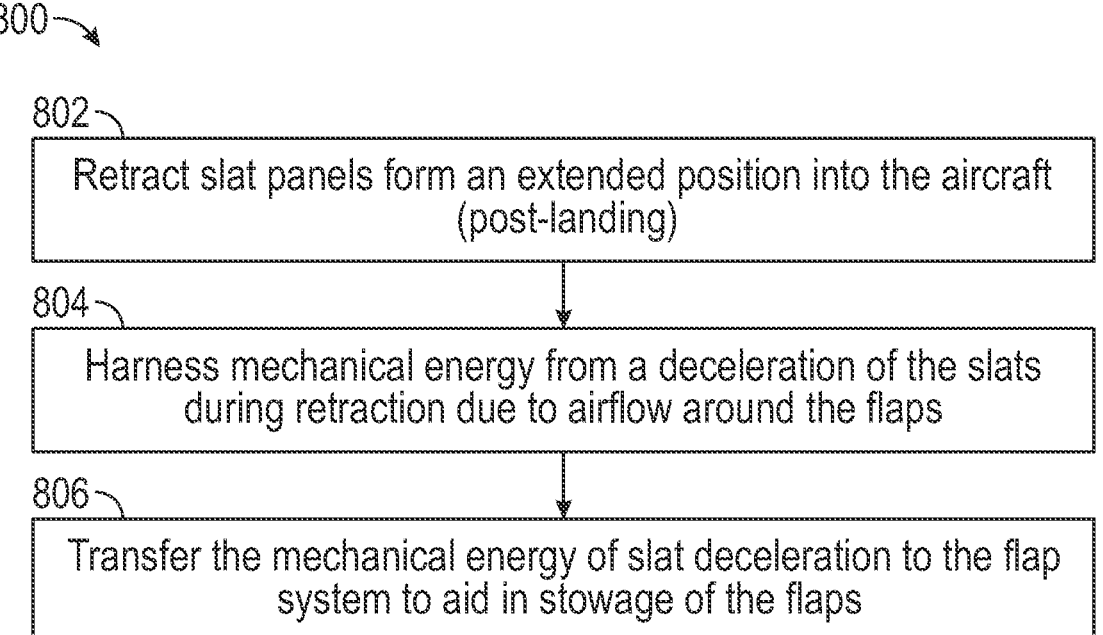

802 — Retract slat panels form an extended position into the aircraft (post-landing)

804 — Harness mechanical energy from a deceleration of the slats during retraction due to airflow around the flaps 806 — Transfer the mechanical energy of slat deceleration to the flap system to aid in stowage of the flaps

REGENERATIVE HIGH LIFT MAGNETIC CLUTCH AND BRAKE GENERATOR FOR ELECTRIC AIRCRAFT

BACKGROUND

Exemplary embodiments pertain to the art of electric aircraft and, in particular, to a system and method for power transfer between control surfaces of the aircraft and regenerating batteries of an electric aircraft using energy harvest from motion of the control surfaces.

Electric aircraft are powered by battery supplies located on the aircraft. An important consideration is conserving energy during flight in order not to run out of battery power. Slats and flaps are used during takeoff and landing and require electrical power. The slats and flaps encounter resistance during their motion, which is energetically costly. Accordingly, there is desired to move these surfaces in a manner that reduces energy costs.

BRIEF DESCRIPTION

Disclosed is a method of operating an electric aircraft. A first control surface on a wing of the electric aircraft is operated. A voltage is induced from mechanical energy generated during a deceleration of the first control surface that occurs while operating the first control surface, wherein an airflow across the first control surface causes the deceleration. A second control surface on the wing is operated using the induced voltage.

Additionally or alternatively, in this or other embodiments, the method further includes rotating a rotor shaft in a gearbox from the mechanical energy, the rotor shaft including an armature rotatable within a stator coil for generating the induced voltage.

Additionally or alternatively, in this or other embodiments, wherein the rotor shaft is mechanically coupled to the first control surface, the method further includes activating a clutch at the rotor shaft to mechanically couple the rotor shaft to the second control surface.

Additionally or alternatively, in this or other embodiments, the method further includes inputting the induced voltage to a boost transformer, wherein a boosted voltage from the boost transformer is used to regenerate a battery.

Additionally or alternatively, in this or other embodiments, the method further includes electrically isolating the stator coil from the battery via the boost transformer.

Additionally or alternatively, in this or other embodiments, the method further includes using the battery to control at least one of the first control surface and the second control surface.

Additionally or alternatively, in this or other embodiments, the first control surface is one of a slat and a flap and the second control surface is another of the slat and the flap.

Additionally or alternatively, in this or other embodiments, the method further includes at least one of: (i) controlling an operation of the slat via the mechanical energy generated during a deceleration of the flap during a pre-takeoff operation; (ii) controlling the operation of the flap via the mechanical energy generated during the deceleration of the slat during a post-takeoff operation; (iii) controlling the operation of the slat via the mechanical energy generated during the deceleration of the flap during a pre-landing operation; and (iv) controlling the operation of the flap via the mechanical energy generated during the deceleration of the slat during a post-landing operation.

Also disclosed is a system for operating an electric aircraft. The system includes a first control surface on a wing of the electric aircraft, a second control surface on the wing, a battery, and a gearbox mechanically coupled to the first control surface. The gearbox is configured to generate an induced voltage at the battery from mechanical energy generated during a deceleration of the first control surface due to an airflow across the first control surface and operate the second control surface using the induced voltage.

Additionally or alternatively, in this or other embodiments, the gearbox further includes a rotor shaft configured to rotate from the mechanical energy from the first control surface, the rotor shaft including an armature rotatable within a stator coil of the gearbox.

Additionally or alternatively, in this or other embodiments, the rotor shaft is mechanically coupled to the first control surface and the system further includes a clutch configured to mechanically couple the rotor shaft to the second control surface.

Additionally or alternatively, in this or other embodiments, the system further includes a boost transformer coupled to the stator coil, wherein the induced voltage generated at the gearbox is supplied to the boost transformer and the boost transformer is configured to supply a boosted voltage to the battery.

Additionally or alternatively, in this or other embodiments, the boost transformer is configured to electrically isolate the stator coil from the battery.

Additionally or alternatively, in this or other embodiments, the battery is configured to control an operation of at least one of the first control surface and the second control surface.

Additionally or alternatively, in this or other embodiments, the first control surface is one of a slat and a flap and the second control surface is another of the slat and the flap.

Additional features and advantages are realized through the techniques of the present disclosure. Other embodiments and aspects of the disclosure are described in detail herein and are considered a part of the claimed disclosure. For a better understanding of the disclosure with the advantages and the features, refer to the description and to the drawings.

BRIEF DESCRIPTION OF THE DRAWINGS

The following descriptions should not be considered limiting in any way. With reference to the accompanying drawings, like elements are numbered alike:

FIG. 5 shows a flowchart of a method of power transfer during a pre-takeoff operation;

FIG. 6 shows a flowchart of a method of power transfer during a post-takeoff operation;

FIG. 7 shows a flowchart of a method of power transfer during a pre-landing operation;

FIG. 8 shows a flowchart of a method of power transfer during a post-landing operation;

DETAILED DESCRIPTION

A detailed description of one or more embodiments of the disclosed apparatus and method are presented herein by way of exemplification and not limitation with reference to the Figures.

Figure 1:
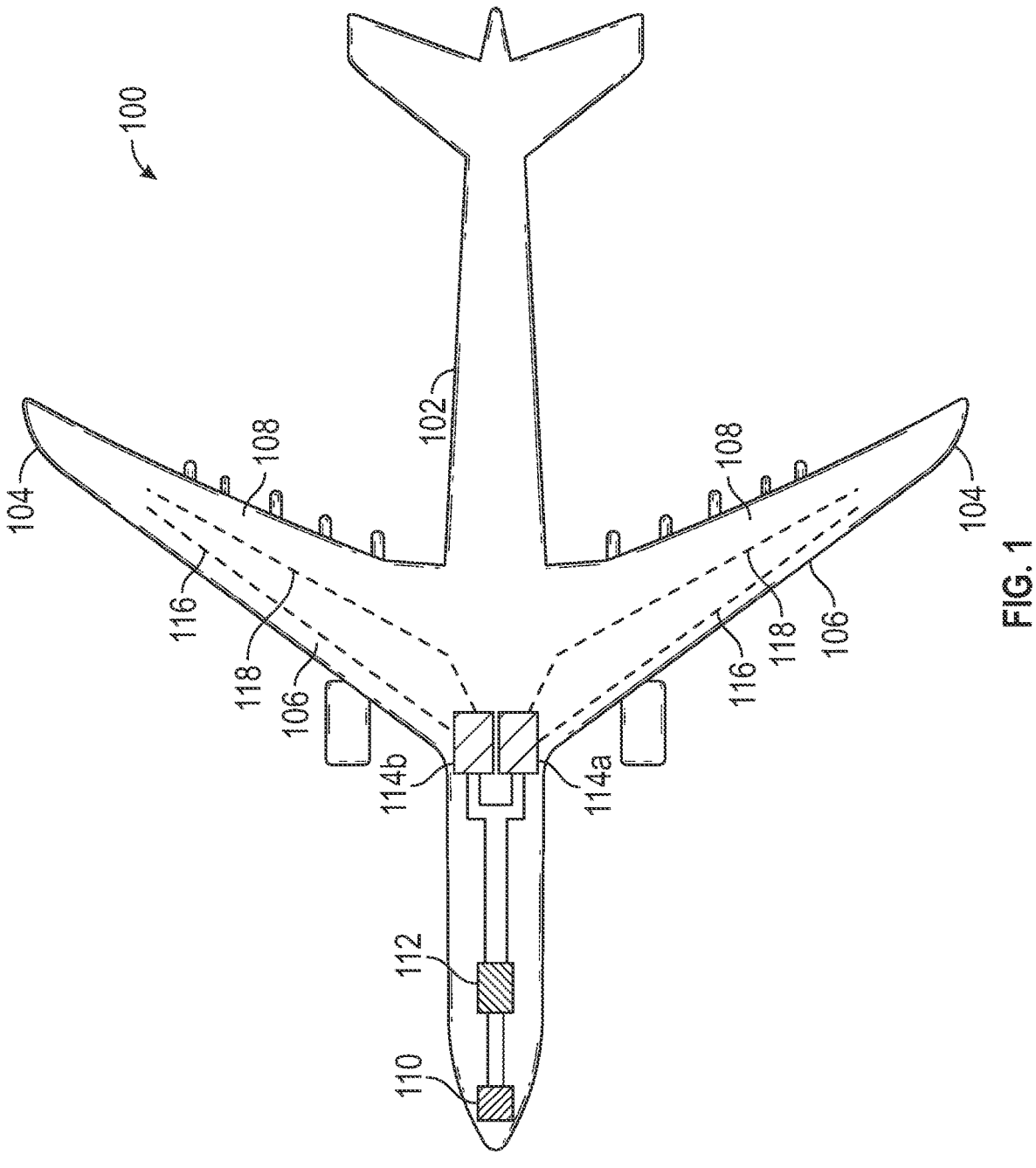
FIG. 1 shows an airplane in a plan view.

With reference now to FIG. 1, an airplane 100 is shown in a plan view. In various embodiment, the airplane 100 is an electric airplane, powered by an electric power source or batteries. The airplane 100 includes a fuselage 102 and wings 104. Each wing 104 includes control surfaces, including a slat 106 and a flap 108. A slat 106 is a surface on a forward or leading edge of the wing 104 that can be retracted into a stowed position that is conformal with the leading edge of the wing 104 or extended into an extended position in which an angle of the slat 106 differs from that of the leading edge of the wing 104. When deployed, the slat 106 allows the wing 104 to operate at a higher angle of attack. A flap 108 is a surface on a trailing edge of the wing 104 that can be retracted into a stowed position that is conformal with the trailing edge of the wing 104 or extended into an extended position in which an angle of the flap 108 differs from that of the trailing edge of the wing 104. When deployed, the flap 108 can be used to increase a drag on the airplane 100. As discussed herein, the slat 106 can be one of a first control surface or a second control surface and the flap 108 can be another of the first control surface and the second control surface. In various embodiments, a wing 104 can include a plurality of slats and/or a plurality of flaps 108.

The airplane 100 includes a power source 110, a control system 112, a left-side power distribution unit 114a and a right-side power distribution unit 114b. The power source 110 includes one or more batteries. The control system 112 controls various operations of the aircraft during flight, including flight trajectory, etc. The control system 112 sends control signals for controlling the operation of the slats 106 and the flaps 108 at an appropriate time, generally during takeoff and landing. The control signals are received at the left-side power distribution unit 114a and the right-side power distribution unit 114b. The left-side power distribution unit 114a controls powering of the slats 106 and flaps 108 along the left wing and the right-side power distribution unit 114b controls powering of the slats 106 and flaps along the right wind. A slat control wire 116 extends along each wing 104 to one or more of the slats 106 for distribution of power to control the slats 106. Similarly, a flap control wire 118 extends along each wing 104 for distribution of power to control the flaps 108.

Figure 2:
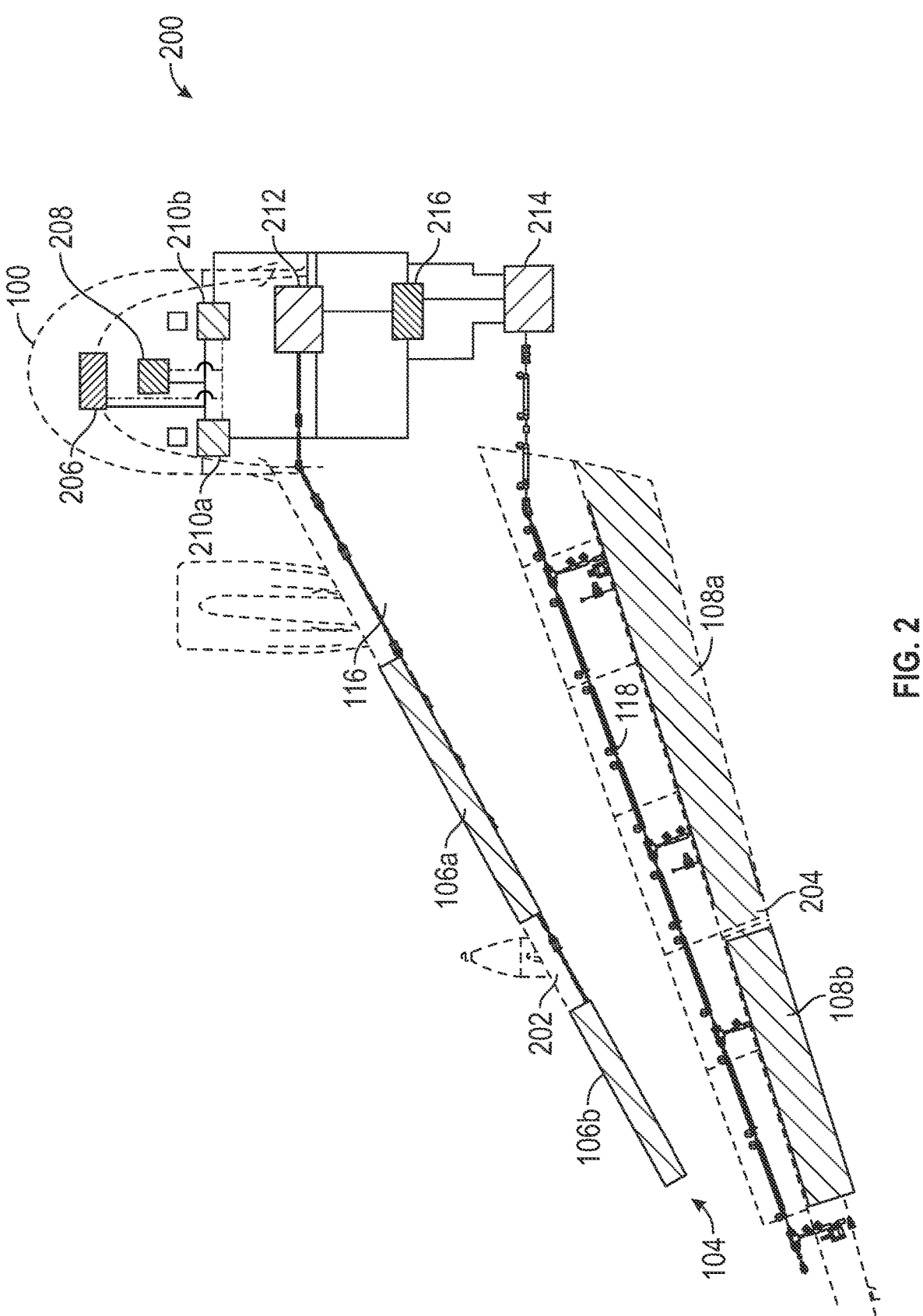
FIG. 2 shows a plan view of a left side of the airplane in an illustrative embodiment.

FIG. 2 shows a plan view 200 of a left side of the airplane 100 in an illustrative embodiment. The left wing 104 includes a plurality of slats (106a, 106b, . . . ) on its leading edge 202 and a plurality of flaps (108a, 108b, . . . ) on its trailing edge 204. In various embodiments, each of the plurality of slats 106a, 106b, . . . is associated with one of the plurality of flaps 108a, 108b, . . . , and vice versa. The airplane 100 includes an aircraft flight computer 206, batteries 208, a left-side electronic control unit 210a, and a right-side electronic control unit 210b. The batteries 208 provide power to the aircraft flight computer 206, the left-side electronic control unit 210a and the right-side electronic control unit 210b.

The airplane 100 further includes a slat power drive unit (slat PDU 212), a flap power drive unit (flap PDU 214), and a gearbox 216. The slat PDU 212 controls mechanical operation of the slats 106 (via slat control wire 116) and is mechanically coupled to the gearbox 216. The flap PDU 214 controls mechanical operation of the flaps (via flap control wire 118) and is mechanically coupled to the gearbox 216. The left-side electronic control unit 210a and the right-side electronic control unit 210b control operation of the gearbox 216 and are electrically coupled to both the slat PDU 212 and the flap PDU 214. The gearbox 216 aides in transferring power between the slats and the flaps, as discussed herein.

Figure 3:
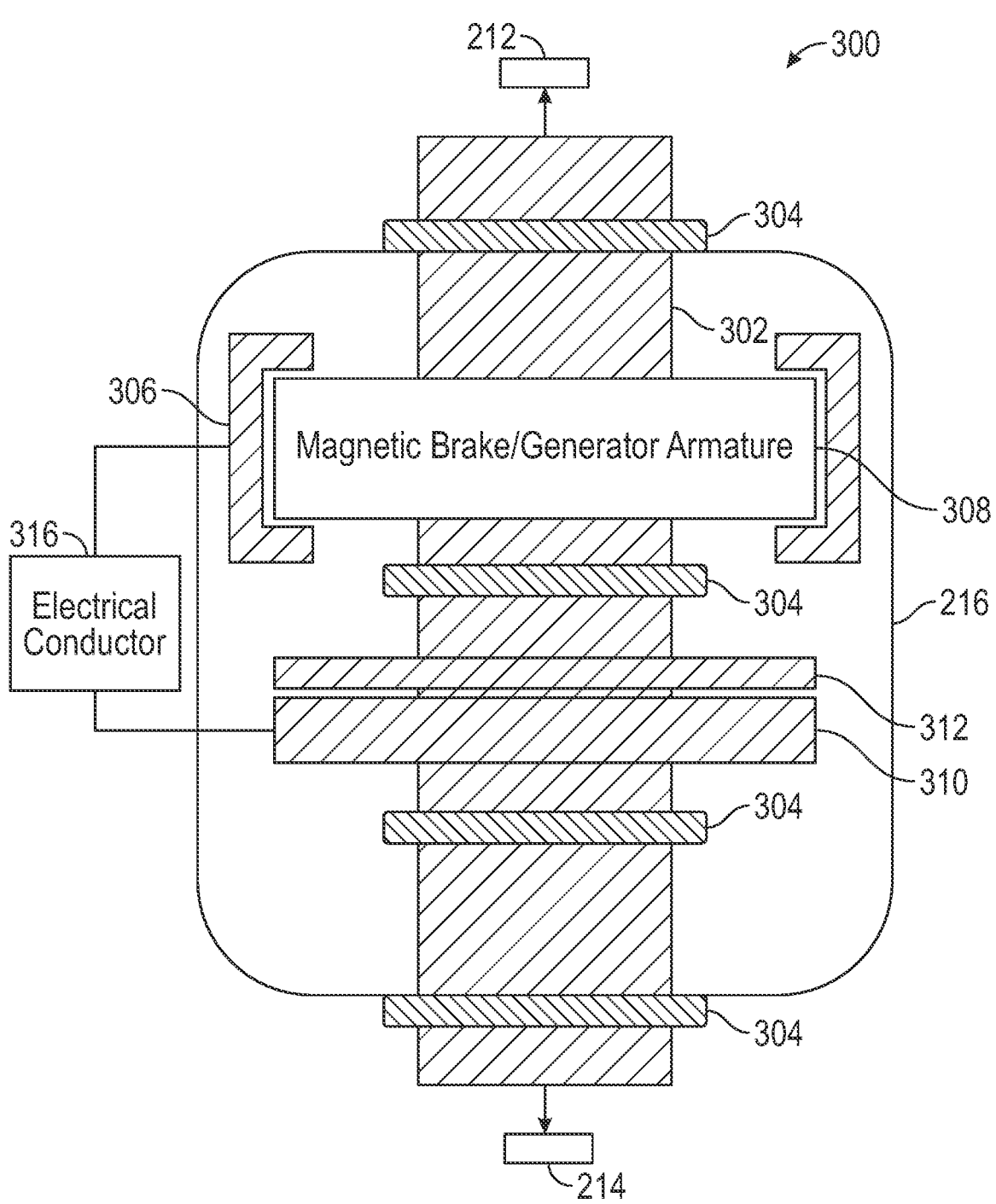
FIG. 3 shows a detailed side view of a gearbox of the airplane, in an illustrative embodiment.

FIG. 3 shows a detailed side view 300 of the gearbox 216, in an illustrative embodiment. A rotor shaft 302 passes through the gearbox 216 and connects to at least one of the slat PDU 212 and the flap PDU 214. Bearings 304 facilitate rotation of the rotor shaft 302 within the gearbox 216. The rotor shaft 302 passes through s stator coil 306 and includes an armature 308 that rotates within the stator coil 306. In one embodiment, electricity flowing through the stator coil 306 can cause the armature 308 to rotate, thereby acting as a motor that provides mechanical energy via the rotor shaft 302 to at least one of the slat PDU 212 and the flap PDU 214. In another embodiment, mechanical energy provided from at least one of the slat PDU 212 and the flap PDU 214 can rotate the armature 308 within the stator coil 306, thereby causing the armature 308 and stator coil 306 to act as an electrical generator or as an electrical brake. Any electric current or electrical power generated by rotation of the armature 308 within the stator coil 306 can be sent via an electrical conductor 316 to the batteries 208 to regenerate the batteries.

The gearbox 216 also includes a magnetic clutch 310 and a clutch engagement plate 312 which can be engaged for transferring of mechanical energy either from the slat PDU 212 to the flap PDU 214 or from the flap PDU 214 to the slat PDU 212. Mechanical energy can also be used to recharge the batteries when the clutch is engaged. When the magnetic clutch 310 is disengaged, a rotation of the rotor shaft 302 causes recharging or regeneration of the batteries 208. A signal can be sent via the electrical conductor 316 to control engagement/disengagement of the magnetic clutch 310.

Figure 4:
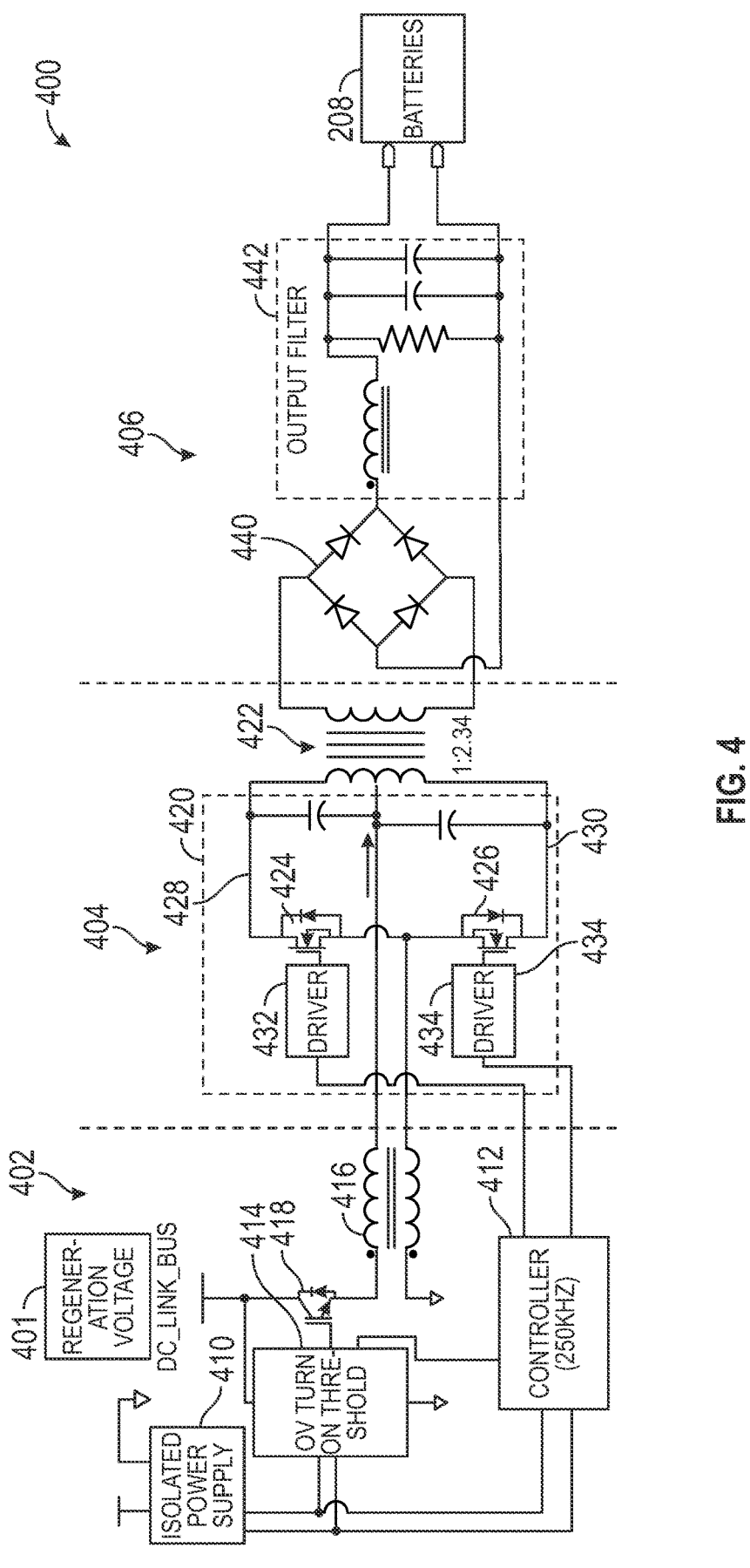
FIG. 4 shows a circuit for charging a battery using a regeneration voltage.

FIG. 4 shows a circuit 400 for charging a battery using a regeneration voltage. The circuit 400 includes a control section 402, a boost section 404 and a recharging section 406. The control section 402 receives an induced voltage 401, which is an alternating current voltage (AC voltage), from the gearbox 216 and delivers the regeneration voltage to the boost section 404. The boost section 404 includes circuitry for boosting the voltage and galvanically isolating the control section 402 from the recharging section 406. The recharging section 406 includes circuitry for recharging the batteries 208 from the boosted voltage provided by the boost section 404.

The control section 402 includes an isolated power supply 410, a controller 412, a starter module 414, and an input voltage transformer 416 and a control transistor 418. The isolated power supply 410 can be a starter battery suitable for use during starting operations of the aircraft, for example. The isolated power supply 410 supplies power to the controller 412 and to the starter module 414. The controller 412 controls operation of the starter module 414. The starter module 414 inputs a signal to a gate of the control transistor 418, thereby causing the control transistor 418 to allow the induced voltage 401 through the input voltage transformer 416. The input voltage transformer 416 outputs a voltage to boost section 404.

The boost section includes an inverter 420 and a boost transformer 422. The inverter 420 includes a first transistor switch 424 and a second transistor switch 426 along a branch extended between a high voltage bus 428 and a low voltage bus 430. A first gate driver 432 supplies a control signal to the first transistor switch 424 and a second gate driver 434 supplies a control signal to the second transistor switch 426. The controller 412 controls operation of the first gate driver 432 and the second gate driver 434. The inverter 420 outputs a primary voltage at a primary side of the boost transformer 422. A secondary voltage (i.e., a boosted voltage) at a secondary side of the boost transformer 422 is provided to the recharging section 406.

The recharging section 406 includes a rectifier 440 and an output filter 442. The rectifier 440 receives the secondary voltage from the boost transformer 422 and outputs a DC voltage. The output filter 442 filters the DC voltage, which is then used to charge the batteries 208.

During take-off and landing, the slats and the flaps are deployed and retracted. Energy can be harvested from one of the slats and the flaps during these operations and can be transferred to the other of the flaps and the slat as well as can be used to recharge power supplies, as discussed herein.

FIG. 5 shows a flowchart 500 of a method of power transfer during a pre-takeoff operation. The pre-takeoff operation occurs as the aircraft is in motion along the runway. In box 502, a flap panel is deployed from its stored position to an extended position during the pre-takeoff operation. Extending the flaps includes a flap acceleration period during which the flap is accelerated from its stowed position (i.e., at zero velocity) and a flap deceleration period during which the flap slows down and settles into its extended position. Airflow over the wing causes a drag that produces the deceleration. In box 504, during the deceleration period of this deployment, mechanical energy is harvested from the deceleration of the flaps due to airflow around the flaps. In box 506, the mechanical energy is transferred to the slat and used to aid in deployment of the slat. Transfer of the mechanical energy includes rotating the rotor shaft 302 at the gearbox 216.

FIG. 6 shows a flowchart 600 of a method of power transfer during a post-takeoff operation. In box 602, the slat panel is retracted from its extended position to a stored position during the post-takeoff operation. Retracting the slats includes a slat acceleration period during which the slat is accelerated inward (from its extended position) and a slat deceleration period during which the slat slows down and settles into its retracted or stored position. The deceleration of the slat can be due to airflow over the wing. In box 604, during a deceleration period of the retraction, mechanical energy is harvested from the deceleration of the slat due to airflow around the slat. In box 606, the mechanical energy is transferred to the flap and used to aid in retraction of the flap. Transfer of mechanical energy can include rotating the rotor shaft 302 at the gearbox.

FIG. 7 shows a flowchart 700 of a method of power transfer during a pre-landing operation. In box 702, a flap panel is deployed from its stored position to an extended position. In box 704, during a deceleration period of this deployment, mechanical energy is harvested from the deceleration of the flaps due to airflow around the flaps. In box 706, the mechanical energy is transferred to the slat and used to aid in deployment of the slat.

FIG. 8 shows a flowchart 800 of a method of power transfer during a post-landing operation. The post-landing operation occurs as the aircraft is in motion along the runway. In box 802, the slat panel is retracted from its extended position to a stored position. In box 804, during a deceleration period of the retraction, mechanical energy is harvested from the deceleration of the slat due to airflow around the slat. In box 806, the mechanical energy is transferred to the flap and used to aid in deployment of the flap.

Figures 9, 10:
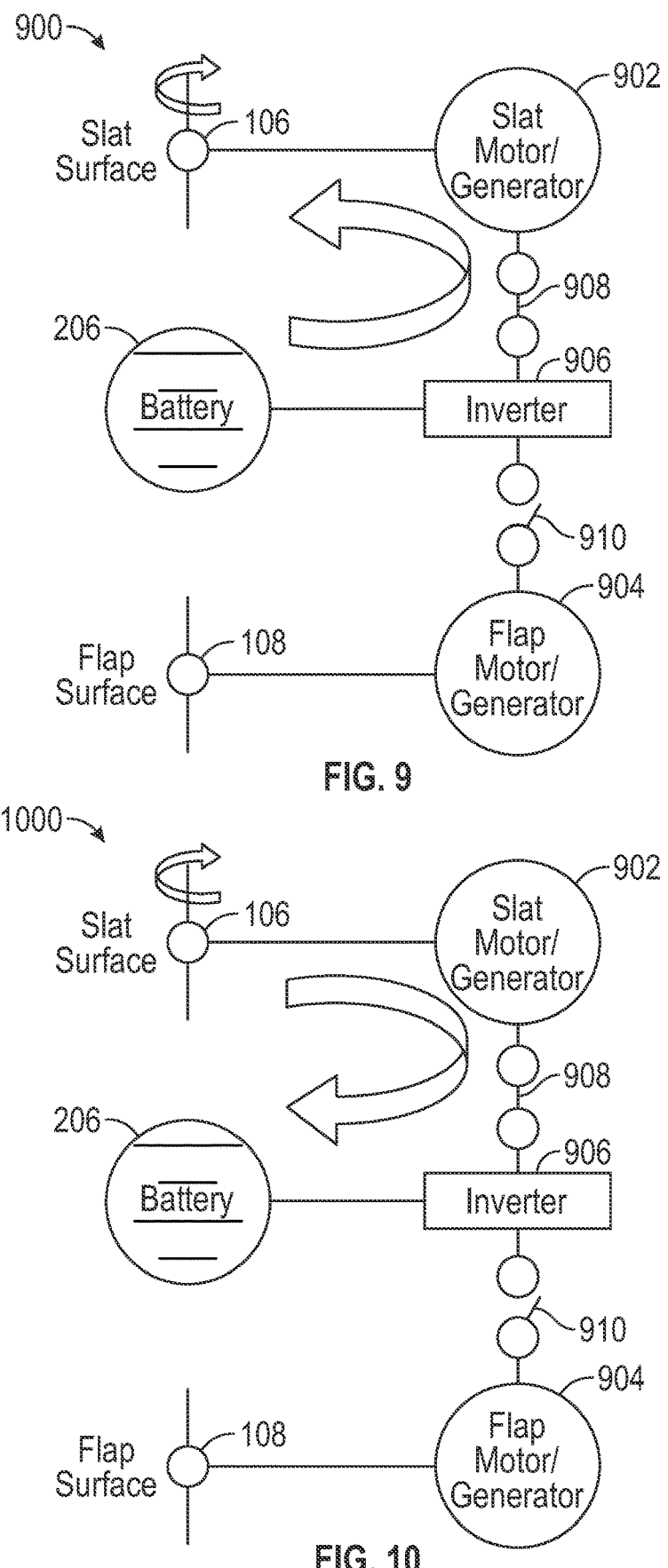
FIG. 9 shows a schematic diagram of a slat/flap control circuit illustrating a method for accelerating a slat.
FIG. 10 shows the slat/flap control circuit during a deceleration period of the slat.

FIG. 9 shows a schematic diagram of a slat/flap control circuit 900 illustrating a method for accelerating a slat 106. The slat/flap control circuit 900 includes the slat 106, the flap 108, batteries 208, a slat motor/generator 902, a flap motor/generator 904, and an inverter 906. A slat switch 908 is located between the inverter 906 and the slat motor/generator 902. A flap switch 910 is located between the inverter 906 and the flap motor/generator 904. During an acceleration period of the slat, the slat switch 908 is closed to connect the slat to the battery and the flap switch 910 is left open. The batteries 208 supply power to the slat 106 to accelerate the slat. The power is supplied via the inverter 906 and the slat motor/generator 902.

FIG. 10 shows the slat/flap control circuit 1000 during a deceleration period of the slat 106. During the deceleration period of the slat, the slat switch 908 is closed to connect the slat to the battery and the flap switch 910 is left open. The slat 106 decelerates and causes the slat motor/generator 902 to generate a current that passes through the inverter 906 to charge the batteries 208.

Figures 11, 12:
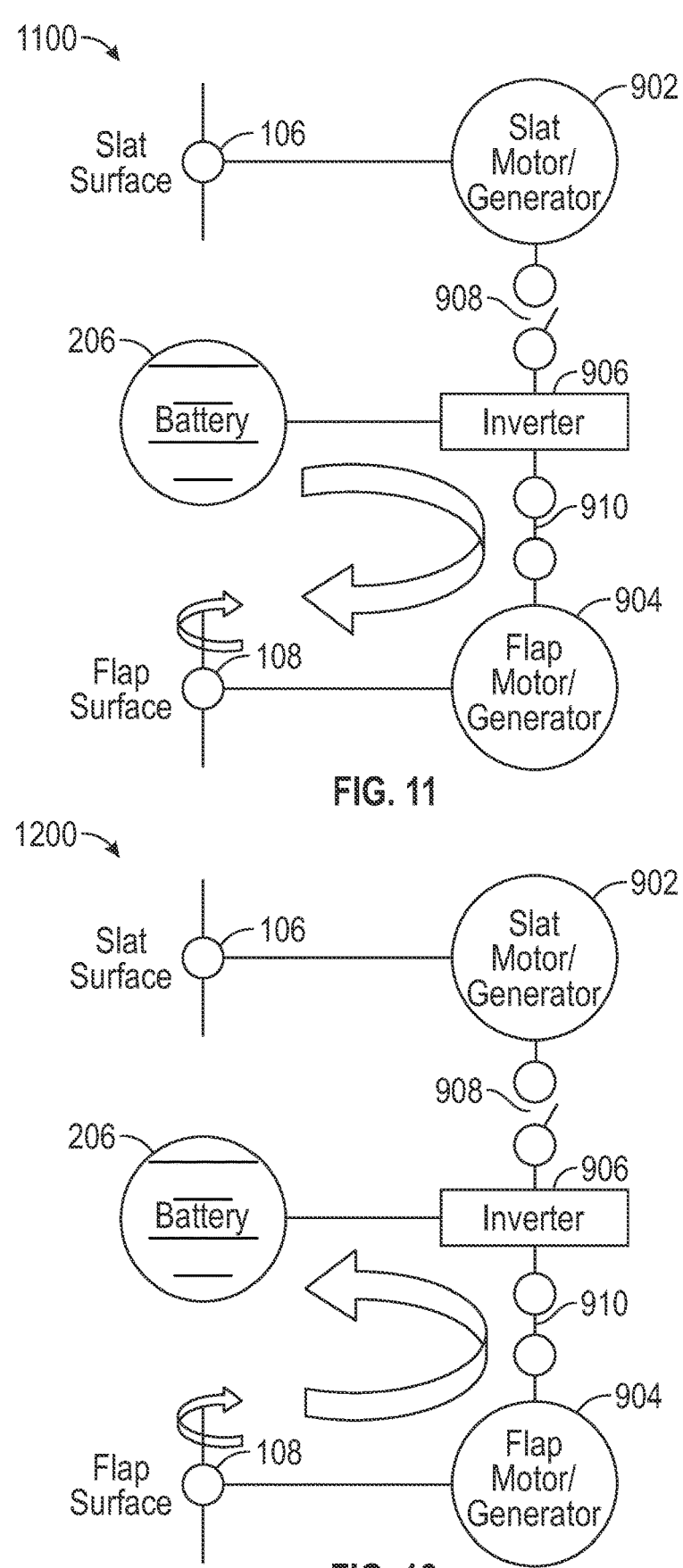
FIG. 11 shows the slat/flap control circuit during an acceleration period of the flap.
FIG. 12 shows the slat/flap control circuit during a deceleration period of the flap.

FIG. 11 shows the slat/flap control circuit 900 during an acceleration period of the flap. The flap switch 910 is closed to connect the flap 108 to the batteries 208. The slat switch 908 is left open. During the acceleration period of the flap 108, the batteries 208 supplies power to the flap 108 via the inverter 906 and the flap motor/generator 904.

FIG. 12 shows the slat/flap control circuit 900 during a deceleration period of the flap 108. The flap switch 910 is closed to connect the flap 108 to the batteries 208. The slat switch 908 is left open. The flap 108 decelerates causing the flap motor/generator 904 to generate a current that passes through the inverter 906 to charge the batteries 208.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of operating an electric aircraft, comprising:
operating a first control surface on a wing of the electric aircraft;
generating an induced voltage from mechanical energy generated during a deceleration of the first control surface that occurs while operating the first control surface, wherein an airflow across the first control surface causes the deceleration;
operating a second control surface on the wing using the induced voltage; and
rotating a rotor shaft in a gearbox from mechanical energy, the rotor shaft including an armature rotatable within a stator coil for generating the induced voltage.

2. The method of claim 1, wherein the rotor shaft is mechanically coupled to the first control surface, further comprising activating a clutch at the rotor shaft to mechanically couple the rotor shaft to the second control surface.

3. The method of claim 2, further comprising inputting the induced voltage to a boost transformer, wherein a boosted voltage from the boost transformer is used to regenerate a battery.

4. The method of claim 3, further comprising electrically isolating the stator coil from the battery via the boost transformer.

5. The method of claim 3, further comprising using the battery to control at least one of the first control surface and the second control surface.

6. The method of claim 1, wherein the first control surface is one of a slat and a flap and the second control surface is another of the slat and the flap.

7. The method of claim 6, further comprising at least one of: (i) controlling an operation of the slat via the mechanical energy generated during a deceleration of the flap during a pre-takeoff operation; (ii) controlling the operation of the flap via the mechanical energy generated during the deceleration of the slat during a post-takeoff operation; (iii)

controlling the operation of the slat via the mechanical energy generated during the deceleration of the flap during a pre-landing operation; and (iv) controlling the operation of the flap via the mechanical energy generated during the deceleration of the slat during a post-landing operation.

8. A system for operating an electric aircraft, comprising:
a first control surface on a wing of the electric aircraft;
a second control surface on the wing;
a battery; and
a gearbox mechanically coupled to the first control surface, wherein the gearbox is configured to generate an induced voltage at the battery from mechanical energy generated during a deceleration of the first control surface due to an airflow across the first control surface and operate the second control surface using the induced voltage.

9. The system of claim 8, wherein the gearbox further comprises a rotor shaft configured to rotate from the mechanical energy from the first control surface, the rotor shaft including an armature rotatable within a stator coil of the gearbox.

10. The system of claim 9, wherein the rotor shaft is mechanically coupled to the first control surface, further comprising a clutch configured to mechanically couple the rotor shaft to the second control surface.

11. The system of claim 10, further comprising a boost transformer coupled to the stator coil, wherein the induced voltage generated at the gearbox is supplied to the boost transformer and the boost transformer is configured to supply a boosted voltage to the battery.

12. The system of claim 11, wherein the boost transformer is configured to electrically isolate the stator coil from the battery.

13. The system of claim 11, wherein the battery is configured to control an operation of at least one of the first control surface and the second control surface.

14. The system of claim 8, wherein the first control surface is one of a slat and a flap and the second control surface is another of the slat and the flap.

* * * * *